United States Patent
Sato et al.

(10) Patent No.: US 9,442,300 B2
(45) Date of Patent: Sep. 13, 2016

(54) OPTICAL DEVICE

(71) Applicant: FUJITSU LIMITED, Kawasaki-shi, Kanagawa (JP)

(72) Inventors: Teruyuki Sato, Tama (JP); Norihiro Kakuko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/669,618

(22) Filed: Mar. 26, 2015

(65) Prior Publication Data

US 2015/0316779 A1    Nov. 5, 2015

(30) Foreign Application Priority Data

Apr. 30, 2014    (JP) .................................. 2014-094195

(51) Int. Cl.
   *G02B 27/22*    (2006.01)
(52) U.S. Cl.
   CPC ................................. *G02B 27/2214* (2013.01)
(58) Field of Classification Search
   CPC .............. G02B 27/2214; G02B 27/22; G02B 2027/0134; G02B 27/0101; G02B 27/2228; H04N 13/0404; H04N 13/0409; H04N 13/0225
   USPC ........ 359/463, 462, 464, 466, 467, 475, 477
   See application file for complete search history.

(56) References Cited

U.S. PATENT DOCUMENTS

| | | | |
|---|---|---|---|
| 5,956,001 A * | 9/1999 | Sumida | G02B 27/2214 345/55 |
| 6,023,277 A * | 2/2000 | Osaka | G02B 27/2214 345/419 |
| 6,940,646 B2 * | 9/2005 | Taniguchi | G02B 27/2214 348/54 |
| 2002/0021492 A1 * | 2/2002 | Morishima | G02B 27/2214 359/463 |

FOREIGN PATENT DOCUMENTS

| | | |
|---|---|---|
| JP | 2000-206456 | 7/2000 |
| JP | 2004-280052 | 10/2004 |

OTHER PUBLICATIONS

H. Hagura et al., "Auto-Stereographic 3D", ISBN978-4-54-20151-2, The Asakura Shoten, p. 44, Line 1 to p. 45, Line 8, 2012.

* cited by examiner

*Primary Examiner* — Jade R Chwasz

(74) *Attorney, Agent, or Firm* — Staas & Halsey LLP

(57) ABSTRACT

A device disposed on a display surface side of an apparatus having pixels arranged in a matrix, each pixel having sub-pixels arranged in a first axis direction includes: a light-blocking unit disposed on the surface, the light-blocking unit including M×N apertures for each pixel; a first lens disposed on the side, of the light-blocking unit, opposite to the surface, the first lens including first lens part(s) arranged in a stripe pattern within a width of each pixel in the second axis direction; and a second lens disposed on the side, of the first lens, opposite to the light-blocking unit or between the light-blocking unit and the first lens, the second lens including second lens parts arranged in a stripe pattern within the width of each pixel in the first axis direction at a pitch by dividing a pitch of the first lens part in the second axis direction.

4 Claims, 12 Drawing Sheets

OPTICAL DEVICE

CROSS-REFERENCE TO RELATED APPLICATION

This application is based upon and claims the benefit of priority of the prior Japanese Patent Application No. 2014-094195, filed on Apr. 30, 2014, the entire contents of which are incorporated herein by reference.

FIELD

The embodiment discussed herein is related to an optical device.

BACKGROUND

There has heretofore been a stereoscopic image display device including: a light source unit configured to form a predetermined light emitting pattern including a pattern in which light emitting parts are discretely formed and the light emitting parts and non-light emitting parts are alternately arranged in a horizontal direction; and a light emitting pattern conversion unit configured to form a secondary light emitting pattern by converting the light emitting pattern of the light source unit (see, for example, Japanese Laid-Open Patent Publication No. 2000-206456).

The stereoscopic image display device further includes a display device configured to display a stripe composite image formed by dividing parallax images into a large number of stripe pixel arrays and arranging the stripe pixel arrays in a predetermined order.

The stereoscopic image display device is configured to modulate light from the secondary light emitting pattern by the stripe composite image displayed on the display device, and to guide the modulated light to predetermined regions according to the viewpoints of the modulation, thereby allowing an observer to recognize a stereoscopic image.

The stereoscopic image display device further includes a microoptical element including: a vertical cylindrical lens array (vertical lenticular lens) formed by arranging a large number of cylindrical lenses in a horizontal direction, each cylindrical lens being elongated in a vertical direction and having optical power in the horizontal direction; and a horizontal cylindrical lens array (horizontal lenticular lens) formed by arranging a large number of cylindrical lenses in the horizontal direction, each cylindrical lens being elongated in the horizontal direction and having optical power in the vertical direction.

As to the microoptical element in which the vertical lenticular lens and the horizontal lenticular lens are overlapped as in the conventional stereoscopic image display device, the two lenticular lenses have different preferred viewing distances. Thus, there is a possibility that a clear image may not be obtained due to image blurring.

SUMMARY

According to an aspect of the embodiments, an optical device disposed on a display surface side of a display device having pixels arranged in a matrix, each pixel having sub-pixels arranged in a first axis direction includes: a light blocking barrier disposed on the display surface, the light blocking barrier including M×N apertures for each of the pixels (M is a multiple of the number of the sub-pixels in one pixel and N is an integer), where the M apertures are formed in the first axis direction and the N apertures are formed in a second axis direction perpendicular to the first axis direction; a first lens disposed on the side, of the light blocking barrier, opposite to the display surface, the first lens including one or more first lens parts arranged in a stripe pattern within a width of each pixel in the second axis direction, the first lens parts each extending across a region of two or more of the pixels in the first axis direction and having refractive power in the second axis direction; and a second lens disposed on the side, of the first lens, opposite to the light blocking barrier or between the light blocking barrier and the first lens, the second lens including second lens parts arranged in a stripe pattern within the width of each pixel in the first axis direction at a pitch obtained by dividing a pitch of the first lens part in the second axis direction by the number of the sub-pixels, the second lens parts each extending across a region of two or more of the pixels in the second axis direction and having refractive power in the first axis direction, wherein, in a region within a shorter one of first and second preferred viewing distances where the first preferred viewing distance denotes a preferred viewing distance of the first lens and the second preferred viewing distance denotes a preferred viewing distance of the second lens, an aperture size of the apertures is set so that each of projection regions projected into a space through the apertures, the first lens and the second lens is smaller than a region determined by the size of a pupil, and a first interval between the projection regions adjacent to each other in the first axis direction and a second interval between the projection regions adjacent to each other in the second axis direction are smaller than a diameter of the pupil.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, description is given of an embodiment to which an optical device according to the present disclosure is applied.

Embodiment

Figure 1:
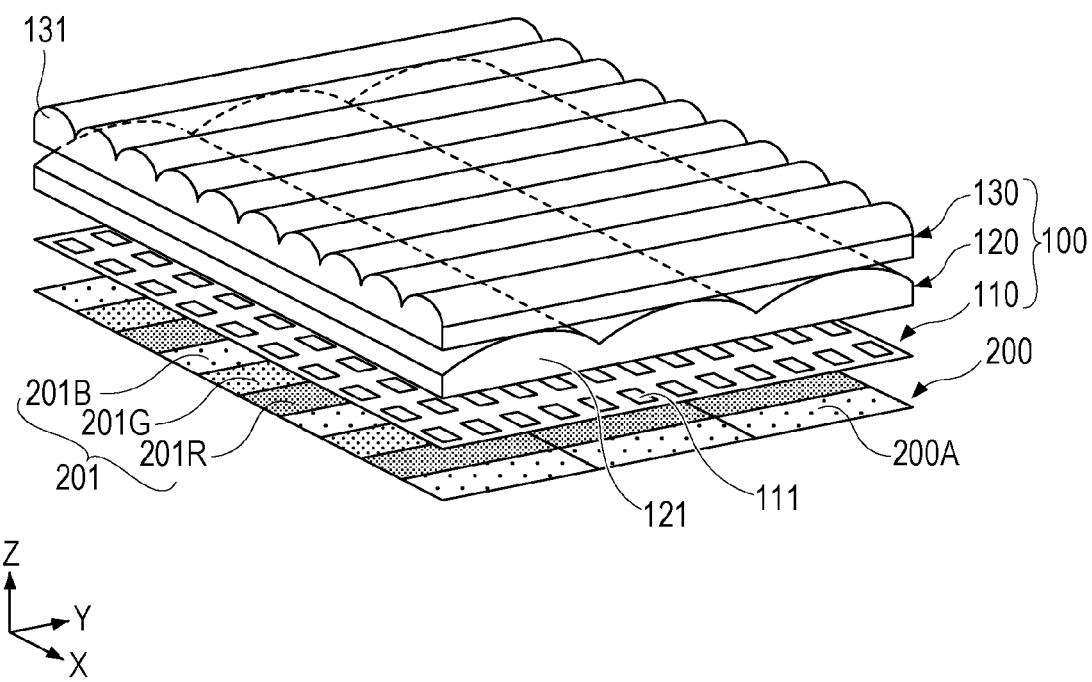
FIG. 1 is a perspective view illustrating a state where an optical device 100 according to an embodiment is disposed overlapping with a display device 200.

FIG. 1 is a perspective view illustrating a state where an optical device 100 according to an embodiment is disposed overlapping with a display device 200. Note that, hereinafter, an XYZ orthogonal coordinate system is defined as illustrated in FIG. 1. X-axis is an example of a first axis, and Y-axis is an example of a second axis.

The optical device 100 is disposed on a display surface 200A of the display device 200. The display surface 200A is parallel to an X-Y plane.

Note that, hereinafter, viewing the X-Y plane from the positive Z-axis direction is referred to as planar view. Also, for the purpose of illustration, the positive Z-axis direction side of the display surface 200A is hereinafter referred to as the upper side (or top) of the display surface 200A, which, however, does not refer to a universal top-bottom relationship.

The display device 200 is a thin plate-shaped display device such as a liquid crystal display panel, an Organic Electro-Luminescence (OEL) display panel or a plasma display panel, for example. On the display surface 200A of the display device 200, pixels 201 are arranged in a matrix in X-axis and Y-axis directions. Note that FIG. 1 illustrates a part of the display device 200 and a part of the optical device 100 in the X-axis and Y-axis directions.

Here, description is given assuming, as an example, that each of the pixels 201 includes sub-pixels 201R, 201G, and 201B corresponding to R (Red), G (Green), and B (Blue). However, the number of the sub-pixels in each pixel 201 is not limited to three, but the pixel 201 may include two or more sub-pixels.

Each pixel 201 is square in planar view, as an example, and the sub-pixels 201R, 201G, and 201B are arranged in the X-axis direction. Therefore, each of the sub-pixels 201R, 201G, and 201B has a rectangular shape, in planar view, having a short side along the X-axis and a long side along the Y-axis.

The optical device 100 includes a light blocking barrier 110, a lenticular lens 120, and a lenticular lens 130. The light blocking barrier 110, the lenticular lens 120, and the lenticular lens 130 are arranged in this order on the display surface 200A of the display device 200.

The light blocking barrier 110 includes apertures 111 arranged in a matrix in the X-axis and Y-axis directions. The light blocking barrier 110 is provided to concentrate light beams by a pinhole effect achieved by allowing light outputted from the display device 200 to pass through the apertures 111.

The light blocking barrier 110 is formed by burning chromium oxide on a surface of the lenticular lens 120 on the negative Z-axis direction side (light incidence plane) or the display surface 200A of the display device 200, for example.

Alternatively, the light blocking barrier 110 may be fabricated by forming the apertures 111 in a matrix in a thin plate member made of resin. The light blocking barrier 110 thus fabricated may be disposed between the display surface 200A and the incidence plane of the lenticular lens 120.

Note that the configuration of the light blocking barrier 110 is not limited to that described above, but the light blocking barrier 110 may have another configuration that may concentrate light beams by the pinhole effect. For example, the light blocking barrier may be configured by overlapping a first light blocking barrier including first slits arranged in the Y-axis direction, the first slit having a rectangular shape with a longitudinal direction in the X-axis direction, with a second light blocking barrier including second slits arranged in the X-axis direction, the second slit having a rectangular shape with a longitudinal direction in the Y-axis direction. In such a light blocking barrier, apertures are arranged in a matrix in portions where the first and second slits intersect each other. The light blocking barrier having such a configuration is described later.

The apertures 111 are formed in a rectangular shape so as to have a pair of sides parallel to the X-axis and a pair of sides parallel to the Y-axis within the X-Y plane. Thus, light (light beam) outputted from the display device 200 is concentrated in the X-axis and Y-axis directions. In other words, the light (light beam) outputted from the display device 200 is two-dimensionally converged in the X-axis and Y-axis directions by the apertures 111. The light passing through the apertures 111 enters the lenticular lenses 120 and 130.

The apertures 111 are provided, as an example, one for each of the sub-pixels 201R, 201G, and 201B in the X-axis direction within each pixel 201. More specifically, in FIG. 1, three apertures 111 are arranged in the X-axis direction in each pixel 201. All the apertures 111 are formed at a regular pitch in the X-axis direction.

Also, as an example, four apertures 111 are arranged in the Y-axis direction within each pixel 201. All the apertures 111 are formed at a regular pitch in the Y-axis direction.

Thus, in the exemplary embodiment illustrated in FIG. 1, twelve apertures 111 are formed for each pixel 201.

Here, the aperture size of the apertures 111 is set to an appropriate size based on a relationship between the size of a human pupil and curvatures of the lenticular lenses 120 and 130. The size of the apertures 111 is described later.

Note that the number of the apertures 111 arranged in the Y-axis direction within one pixel 201 may be set to an appropriate number based on the length of the apertures 111 in the Y-axis direction and the length of the sub-pixels 201R, 201G, and 201B in the Y-axis direction. For example, when the length of the sub-pixels 201R, 201G, and 201B in the Y-axis direction is shorter than that illustrated in FIG. 1 and close to the length of the apertures 111 in the Y-axis direction, the number of the apertures 111 arranged in the Y-axis direction within one pixel 201 may be one.

The lenticular lens 120 is a transparent lens having a configuration in which lens parts 121 are arranged in a stripe pattern in the Y-axis direction, the lens parts 121 extending across a region of the pixels 201 in the X-axis direction and having refractive power in the Y-axis direction.

The lens part 121 is aligned with the pixels 201 in the Y-axis direction. The width (pitch) of the lens part 121 in the Y-axis direction is described later.

The lens part 121 is a protruding portion having a semicircular shape in a cross-sectional view perpendicular to the longitudinal direction (X-axis direction) from one surface of a glass plate. All the lens parts 121 have equal refractive power in the Y-axis direction, and the refractive power of the respective lens parts 121 in the Y-axis direction is equal in the X-axis direction.

The lenticular lens 120 is integrally formed from an end of the display surface 200A on the negative X-axis direction side to an end thereof on the positive X-axis direction side, and is also integrally formed from an end of the display surface 200A on the negative Y-axis direction side to an end thereof on the positive Y-axis direction side. Note that the lenticular lens 120 may be divided in the X-axis or Y-axis direction if this causes no influence on optical characteristics.

The lenticular lens 130 is a transparent lens having a configuration in which lens parts 131 are arranged in a stripe pattern in the X-axis direction, the lens part 131 extending across a region of the pixels 201 in the Y-axis direction and having refractive power in the X-axis direction. Here, as an example, a width (pitch) of the lens part 131 in the X-axis direction corresponds to a width (pitch) of one of the sub-pixels (any one of 201R, 201G, and 201B).

The width (pitch) of the lens part 131 in the X-axis direction is described later.

The lens part 131 is a protruding portion having a semicircular shape in a cross-sectional view perpendicular to the longitudinal direction (Y-axis direction) from one surface of a glass plate. All the lens parts 131 have equal refractive power in the X-axis direction, and the refractive power of the respective lens parts 131 in the X-axis direction is equal in the Y-axis direction.

The lenticular lens 130 is integrally formed from an end of the display surface 200A on the negative Y-axis direction side to an end thereof on the positive Y-axis direction side, and is also integrally formed from an end of the display surface 200A on the negative X-axis direction side to an end thereof on the positive X-axis direction side. Note that the lenticular lens 130 may be divided in the X-axis or Y-axis direction if this causes no influence on optical characteristics.

Since the lenticular lenses 120 and 130 have the lens parts 121 and 131 as described above, the apertures 111 in the light blocking barrier 110 are disposed so as to fit into the widths of the lens parts 121 and 131 in the X-axis direction and fit into the widths of the lens parts 121 and 131 in the Y-axis direction, within each of the pixels 201.

Note that the lenticular lenses 120 and 130 are preferably formed of the same material so as to have the same refractive index, and may be made of glass, for example. Moreover, the lenticular lenses 120 and 130 have an equal curvature radius, in other words, have equal refractive power.

Next, the principles of the optical device 100 according to the embodiment are described.

Figure 2:
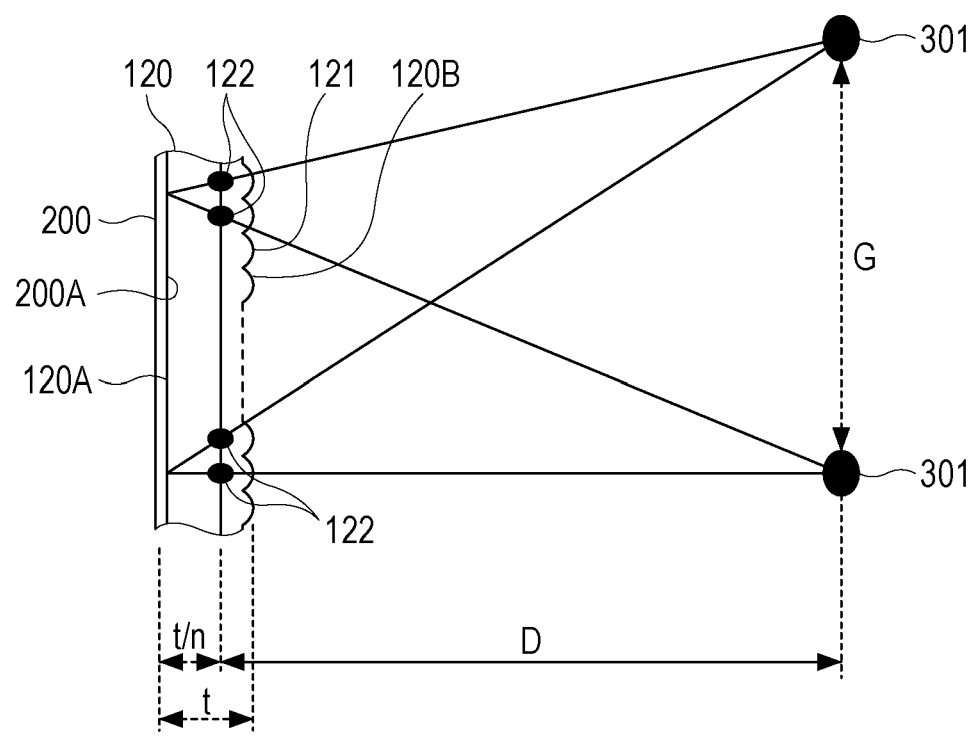
FIG. 2 is a diagram illustrating a position of a viewpoint in an optical system including a lenticular lens 120.

FIG. 2 is a diagram illustrating a position of a viewpoint in an optical system including the lenticular lens 120. Here, for the purpose of illustration, description is given of a viewpoint in an optical system with only the lenticular lens 120 disposed on the display surface 200A of the display device 200. The lenticular lens 120 has an incidence plane 120A and an output plane 120B.

An optical path of light entering the lenticular lens 120 from the display surface 200A of the display device 200 passes through a curvature center 122 of each lens part 121, as indicated by the solid line, and a viewpoint 301 is formed at a spot where the optical paths intersect each other. The viewpoint 301 is formed at a position away from the curvature center 122 by a preferred viewing distance D, and is also referred to as a preferred viewing position. Moreover, an interval between the viewpoints 301 is a viewpoint interval G.

Here, a distance of the curvature center 122 from the incidence plane 120A is approximated by t/n where t is a thickness of the lenticular lens 120 and n is a refractive index. This is described in the document H. Hagura et al., Auto-Stereographic 3D, THE ASAKURA SHOTEN, p 44 (2012).

Also, assuming that the pitch of the lens part 121 is p, the preferred viewing distance D and the viewpoint interval G are expressed by two variables of the thickness t and the pitch p.

Figure 3A:
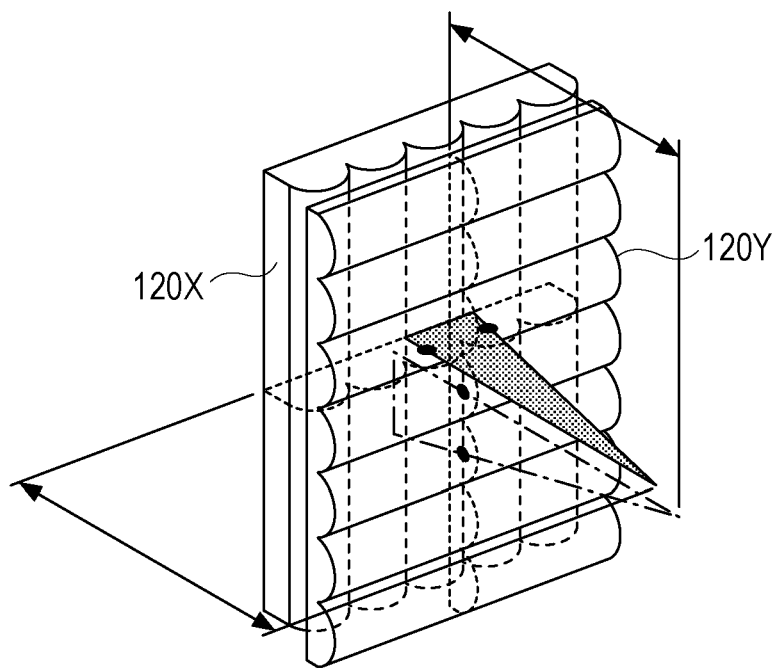
FIGS. 3A and 3B are diagrams illustrating a preferred viewing distance in an optical system with two overlapping lenticular lenses 120.
Figure 3B:
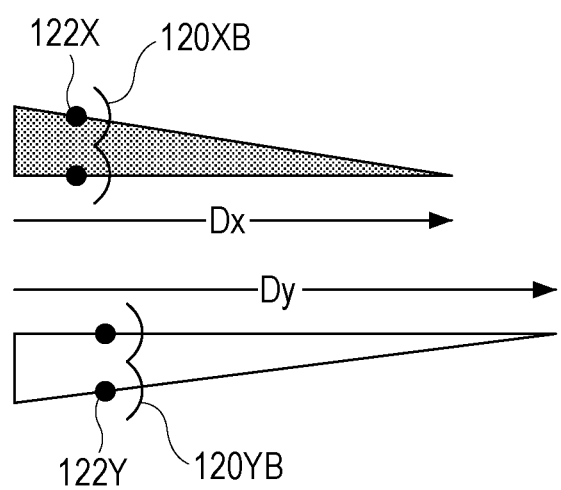

FIGS. 3A and 3B are diagrams illustrating a preferred viewing distance in an optical system with two overlapping lenticular lenses 120.

As illustrated in FIG. 3A, lenticular lenses 120X and 120Y are overlapped. The lenticular lens 120X is obtained by rotating the lenticular lens 120 illustrated in FIG. 1 by 90 degrees (within the X-Y plane illustrated in FIG. 1), and the lenticular lens 120Y is the same as the lenticular lens 120 illustrated in FIG. 1. The lenticular lens 120Y is positioned at the output side of the lenticular lens 120X in a light passing direction.

Here, description is given assuming that the lenticular lenses 120X and 120Y are disposed on the display surface 200A of the display device 200 illustrated in FIG. 1.

In FIG. 3B, output planes of the lenticular lenses 120X and 120Y are denoted by reference numerals 120XB and 120YB.

When light enters the lenticular lenses 120X and 120Y thus overlapped, the light is outputted after being converged in the X-axis direction by the lenticular lens 120X and converged in the Y-axis direction by the lenticular lens 120Y.

In this event, as to preferred viewing distances Dx and Dy of the lenticular lenses 120X and 120Y, the preferred viewing distance Dy of the lenticular lens 120Y in the front in the light passing direction is longer than the preferred viewing distance Dx of the lenticular lens 120X in the back. This is because, as to distances between the display surface 200A (see FIG. 1) of the display device 200 and positions of curvature centers 122X and 122Y of the lenticular lenses 120X and 120Y, the lenticular lens 120Y has a longer distance.

As described above, when the two lenticular lenses 120X and 120Y having the same curvature are overlapped and used, the lenticular lens 120Y farther away from the display surface 200A of the display device 200 in the light passing direction has the longer preferred viewing distance Dy.

Therefore, when the lenticular lens 130 is disposed on the output plane 120B side of the lenticular lens 120 as illustrated in FIG. 1, the viewpoint (preferred viewing position) by the lenticular lens 130 is located farther away from the display surface 200A of the display device 200.

Moreover, the viewpoint intervals in the X-axis and Y-axis directions may be adjusted according to the pitches of the lens parts 121 and 131. Thus, a degree of freedom may be obtained in pitch design in the X-axis and Y-axis directions.

Figure 4:
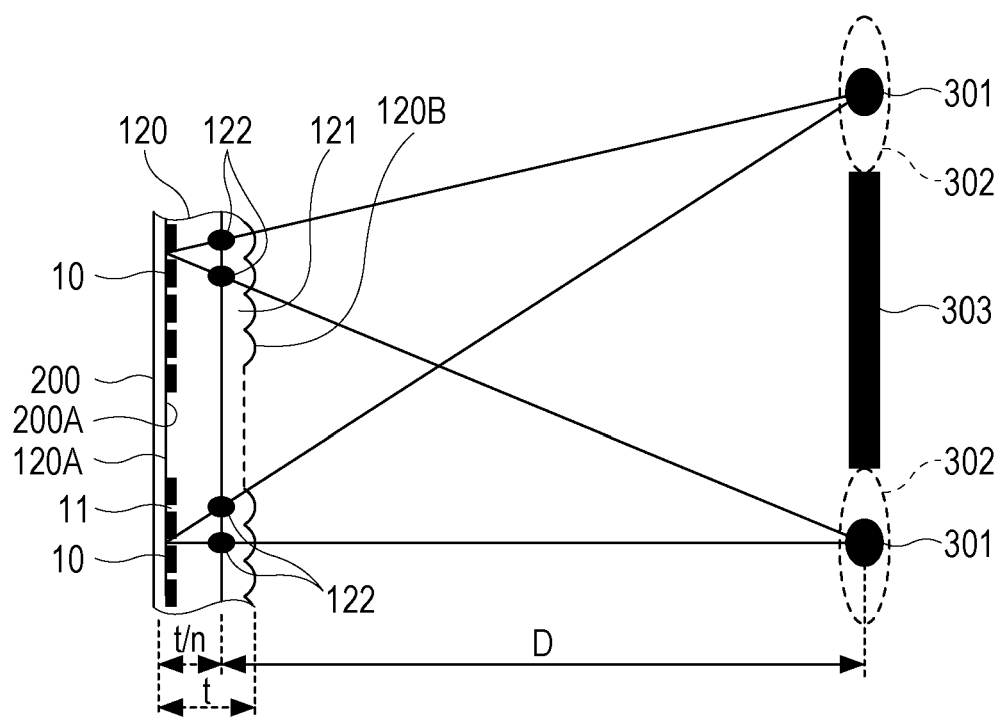
FIG. 4 is a diagram illustrating a position of a viewpoint in an optical system including a light blocking barrier 10 and a lenticular lens 120.

FIG. 4 is a diagram illustrating a position of a viewpoint in an optical system including a light blocking barrier 10 and a lenticular lens 120. FIG. 4 is a diagram illustrating a position of a viewpoint when the light blocking barrier 10 is added to FIG. 2. The light blocking barrier 10 is a light blocking barrier for comparison, which is different from the light blocking barrier 110 according to the embodiment in the number of apertures and pitch. The light blocking barrier 10 has apertures 11. The pitch of the apertures 11 is twice that of the apertures 111 (see FIG. 1) both in the X-axis and Y-axis directions.

An optical path of light entering the lenticular lens 120 from the display surface 200A of the display device 200 passes through a curvature center 122 of each lens part 121, as indicated by the solid line, and a viewpoint 301 is formed at a spot where the optical paths intersect each other.

Also, a light region 302, through which the apertures 11 may be seen, is generated around the viewpoint 301. The light region 302 is a region where light reaches after passing through the apertures 11 and where light converged by the pinhole effect achieved by the apertures 11 reaches. In other words, the light region 302 is an example of a projection region that is projected into a space through the apertures 11, and is a region where the viewpoint 301 is obtained. FIG. 4 illustrates seven apertures 11.

Moreover, a dark region 303 where no light reaches is generated between the light regions 302 by the light blocking barrier 10 blocking the light. The dark region 303 is a region where no light reaches and a shadow of a portion of the light blocking barrier 110 other than the apertures 11 is formed.

The smaller the aperture size of the apertures 11, the stronger the converging by the pinhole effect. On the other hand, the smaller the light region 302, the larger the dark region 303.

Figure 5:
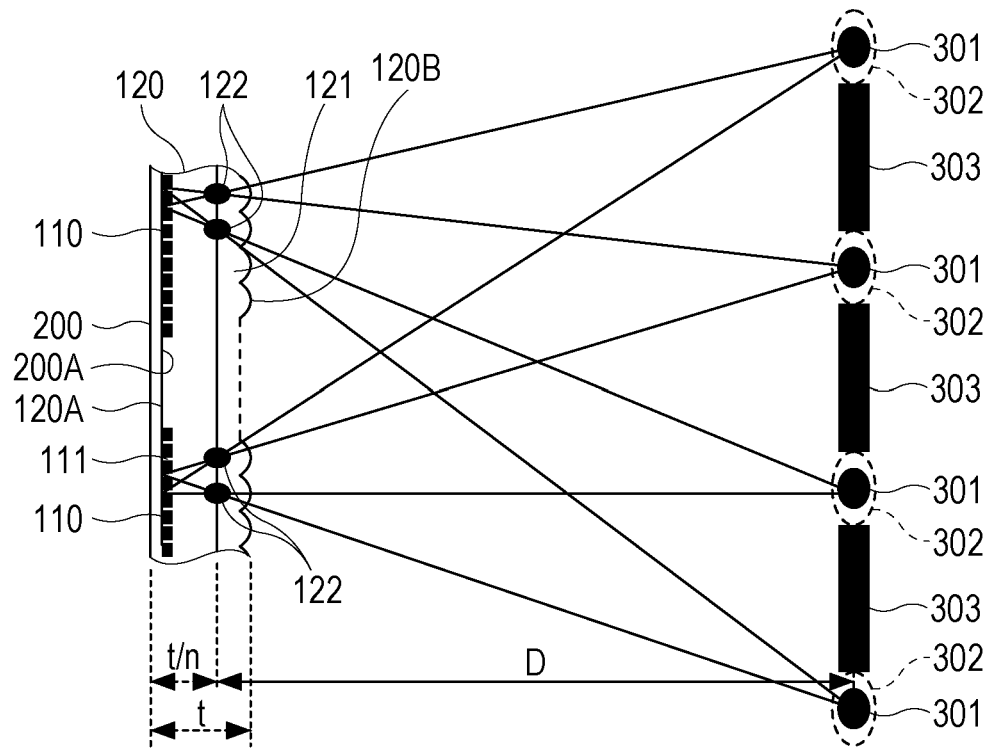
FIG. 5 is a diagram illustrating a position of a viewpoint in an optical system including a light blocking barrier 110 and a lenticular lens 120.

FIG. 5 is a diagram illustrating a position of a viewpoint in an optical system including a light blocking barrier 110 and a lenticular lens 120. FIG. 5 illustrates a position of a viewpoint in an optical system including the light blocking barrier 110 according to the embodiment, instead of the light blocking barrier 10 for comparison in FIG. 4.

The pitch of apertures 111 is half that of the apertures 11 in FIG. 4. Thus, the number of light regions 302 is increased compared with FIG. 4, and dark regions 303 are reduced in size. Accordingly, the viewpoint interval between viewpoints 301 is reduced to half the viewpoint interval in FIG. 4. In other words, the viewpoint interval is proportional to the reciprocal of the pitch ratio.

Thus, the optical system illustrated in FIG. 5 may perform bright display by transmitting more light than the optical system illustrated in FIG. 4. Moreover, since the number of the light regions 302 is increased, the converging by the pinhole effect can be increased by making the aperture size of the apertures 111 smaller than that of the apertures 11 (see FIG. 4).

Figure 6A:
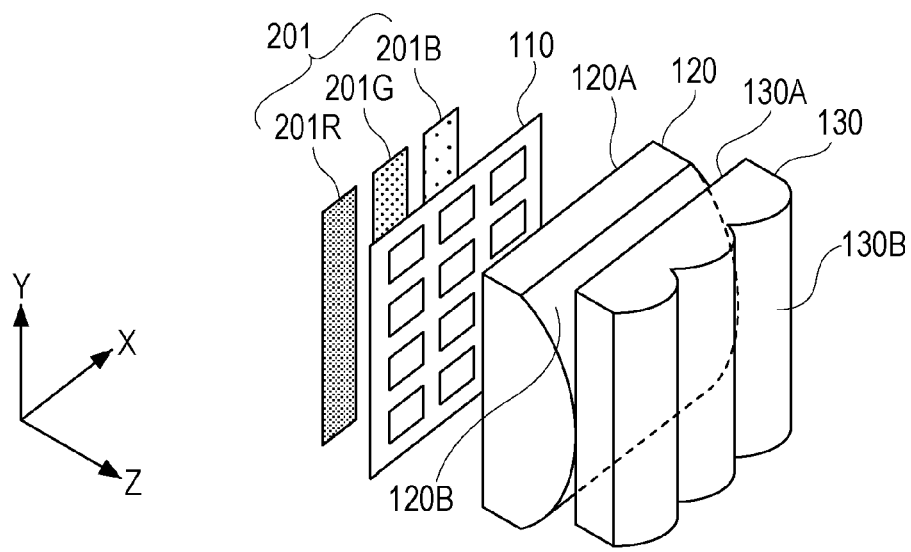
FIGS. 6A and 6B are diagrams illustrating a portion, corresponding to one pixel, of the optical device 100 according to the embodiment.
Figure 6B:
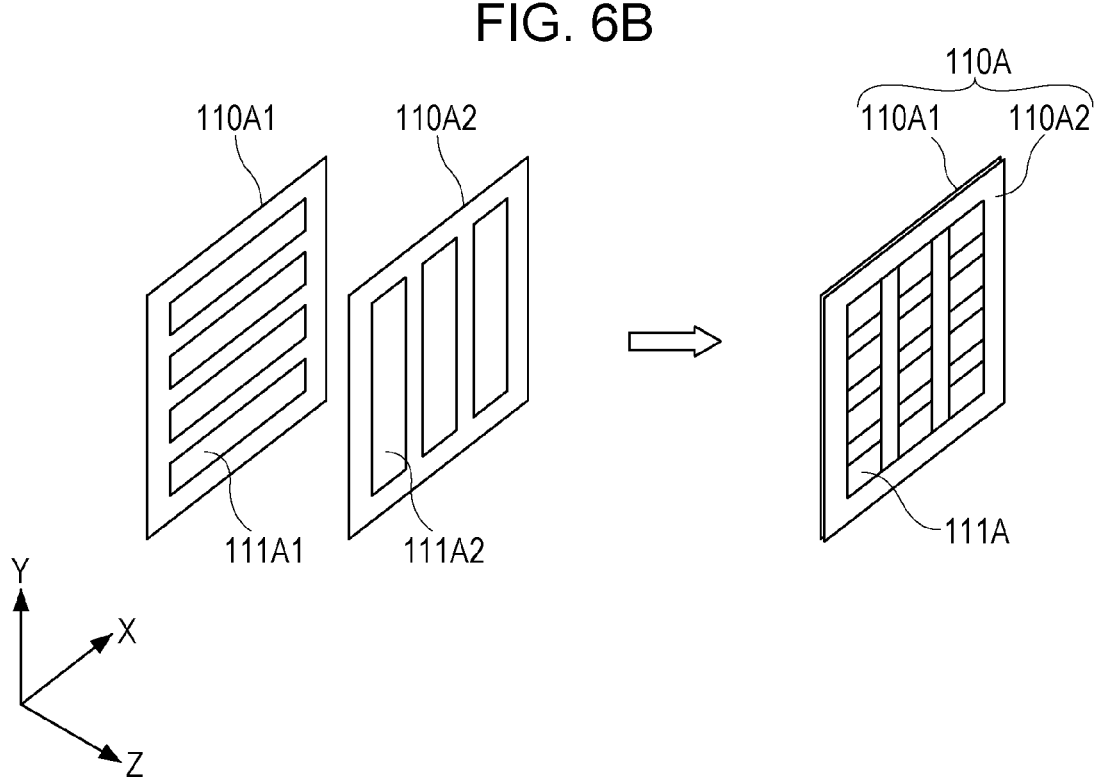

FIGS. 6A and 6B are diagrams illustrating a portion, corresponding to one pixel, of the optical device 100 according to the embodiment.

As illustrated in FIG. 6A, the optical device 100 includes the light blocking barrier 110, the lenticular lens 120, and the lenticular lens 130. The optical device 100 is the same as that illustrated in FIG. 1. The lenticular lens 120 has an incidence plane 120A and an output plane 120B, and the lenticular lens 130 has an incidence plane 130A and an output plane 130B. Note that the incidence planes 120A and 130A are positioned on the negative Z-axis direction side.

As illustrated in FIG. 6A, the light blocking barrier 110 has twelve apertures 111 for each pixel 201 (see FIG. 1). The apertures 111 are arranged, three in the X-axis direction at a regular pitch and four in the Y-axis direction at a regular pitch.

The number of the apertures 111 in the X-axis and Y-axis directions may be arbitrarily set. Thus, the viewpoint intervals in the X-axis and Y-axis directions may be freely set.

Alternatively, a light blocking barrier 110A illustrated in FIG. 6B may be used instead of the light blocking barrier 110 illustrated in FIG. 6A. The light blocking barrier 110A is obtained by overlapping light blocking parts 110A1 and 110A2.

The light blocking part 110A1 includes rectangular slits 111A1 arranged in the Y-axis direction, each slit having a longitudinal direction in the X-axis direction. The light blocking part 110A2 includes rectangular slits 111A2 arranged in the X-axis direction, each slit having a longitudinal direction in the Y-axis direction.

By overlapping such light blocking parts 110A1 and 110A2, apertures 111A are formed in a matrix at portions where the slits 111A1 and 111A2 intersect each other.

Figure 7:
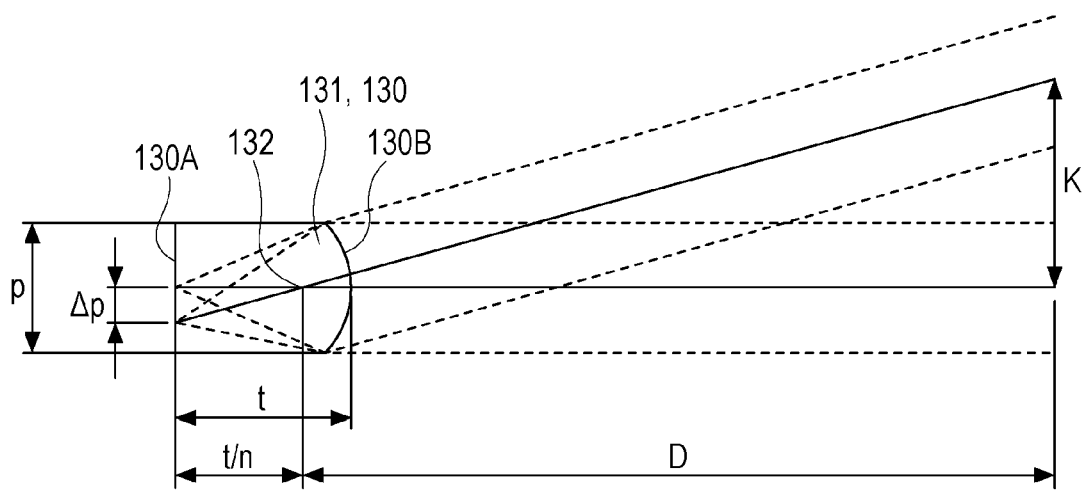
FIG. 7 is a diagram illustrating a geometric structure of lenticular lenses 120 and 130.
Figure 8:
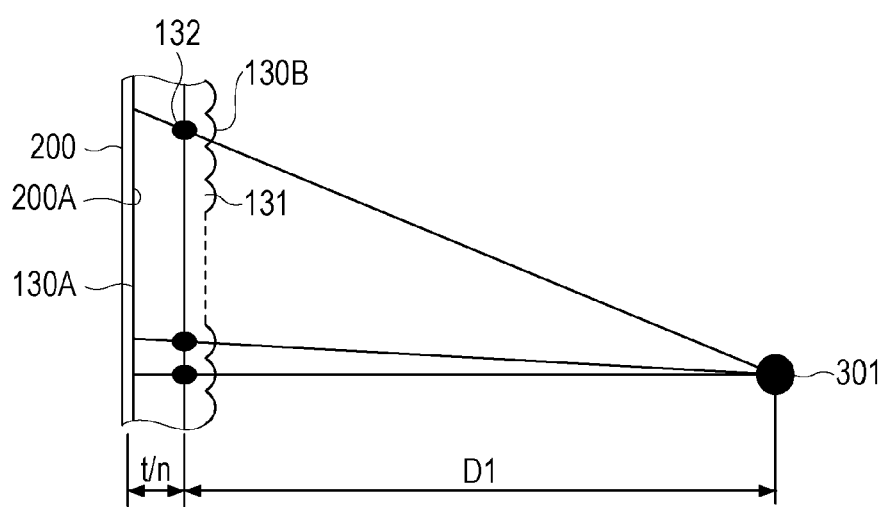
FIG. 8 is a diagram illustrating a geometric structure that forms a viewpoint.

FIG. 7 is a diagram illustrating a geometric structure of the lenticular lenses 120 and 130. FIG. 8 is a diagram illustrating a geometric structure that forms a viewpoint. The lenticular lenses 120 and 130 (see FIG. 6) have basically the same configuration except that the lens parts 121 and 131 have different pitches. Thus, here, the lenticular lens 130 is described. Note that FIGS. 7 and 8 illustrate the lens part 131, curvature center 132, incidence plane 130A, and output plane 130B.

The lenticular lens 130 has a refractive index n, a thickness t, and a curvature radius r. Assuming that the pitch of the lens part 131 is p, a size K of a region is considered where a region of Δp obtained by dividing p by N is projected at a position of an observation distance D1. The division number N is the number of the apertures 111 (see FIG. 6) included in the region of one lens part 131 in planar view, and N=4 in the configuration illustrated in FIG. 6.

From a geometric relationship illustrated in FIG. 7, $\Delta p : t/n = K : D1$, and thus $\Delta p = tK/nD1$ . . . (A1)

Note that $\Delta p = p/N$ . . . (A2). Among the curvature radius r, the refractive index n, and the thickness t when light is focused on the incidence plane 130A, the following equation (A3) is approximately established.

$$t = n/(n-1)r(t-t/n=r) \quad (A3)$$

This is described in the document H. Hagura et al., Auto-Stereographic 3D, THE ASAKURA SHOTEN, p 44 (2012).

In order to obtain the pitch of the lens part 131 for forming the viewpoint, the following equation (A4) is obtained from $p : p\_d = D1 : (D1+t/n)$, based on a geometric relationship illustrated in FIG. 8, where p is the pitch of the lens part 131 and p_d is the pitch of the pixels 201 in the display device 200 (see FIG. 1).

$$p = D1/(D1+t/n)p\_d \quad (A4)$$

The following equation (A5) is obtained by eliminating Δp in the equations (A1) and (A2).

$$t/n = pD1/NK \quad (A5)$$

Here, NK corresponds to the viewpoint interval of the lenticular lens 130.

By substituting the equation (A5) into the equation (A4) and setting p_d=0.025573 mm, N=12, and K=4 mm (NK=48), the pitch p of the lens part 131 is obtained as follows.

p=0.25366 mm

Also, with the lens refractive index=1.5 and the observation distance D1=350 mm, t=2.79 mm is obtained from the equation (A5). Note that the numerical values described above are just an example. Moreover, the viewpoint interval of the lenticular lens 120 may be obtained in the same manner.

Figure 9A:
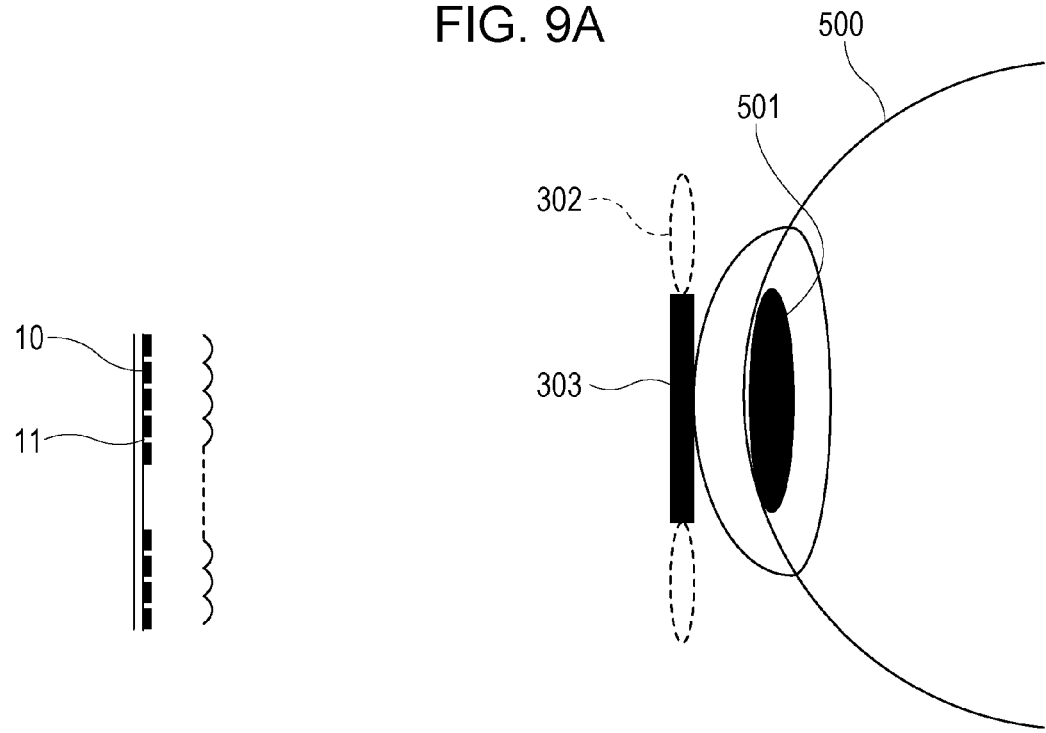
FIGS. 9A and 9B are diagrams illustrating an effect of densifying the viewpoint.
Figure 9B:
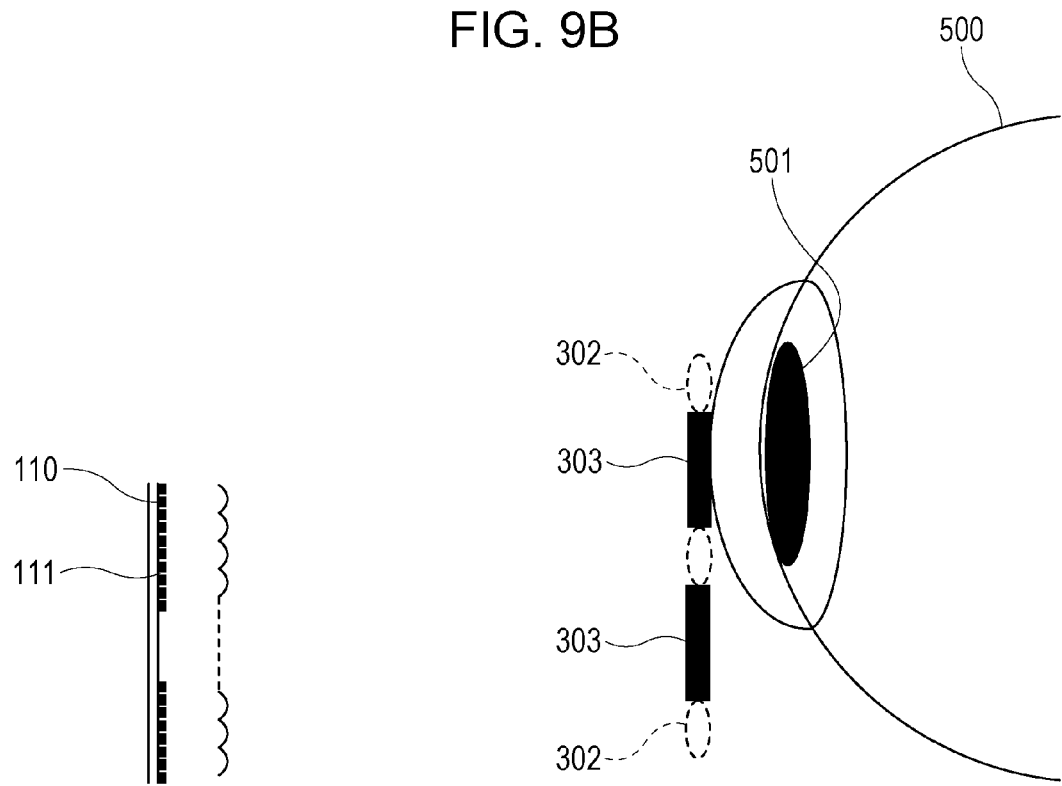

FIGS. 9A and 9B are diagrams illustrating an effect of densifying the viewpoint. FIG. 9A is a diagram illustrating a positional relationship between a geometric structure and a pupil before densification. FIG. 9B is a diagram illustrating a positional relationship between the geometric structure and the pupil after densification.

A light blocking barrier 10 illustrated in FIG. 9A is the light blocking barrier 10 for comparison illustrated in FIG. 4, and includes apertures 11. A light blocking barrier 110 illustrated in FIG. 9B is the light blocking barrier in the optical device 100 (see FIG. 1) according to the embodiment, and includes apertures 111. The pitch of the apertures 11 is twice that of the apertures 111 both in the X-axis and Y-axis directions.

FIGS. 9A and 9B illustrate a pupil 501 of an eyeball 500 of a person.

As illustrated in FIG. 9A, when the size of a dark region 303 is not less than a diameter of the pupil 501, if the position of the pupil 501 coincides with the dark region 303 between light regions 302, light in the light region 302 does not enter the pupil 501. Thus, the person does not see the display on the display device 200 (see FIG. 1).

Figure 10A:
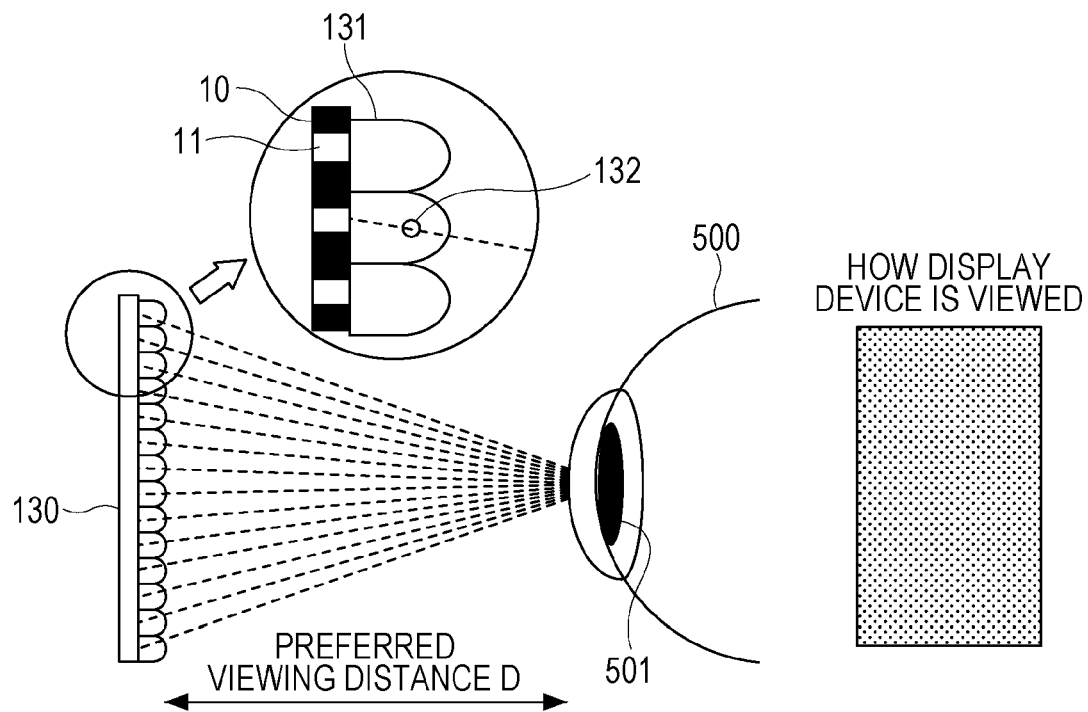
FIGS. 10A and 10B are diagrams explaining a relationship between a preferred viewing distance and a stripe pattern.
Figure 10B:
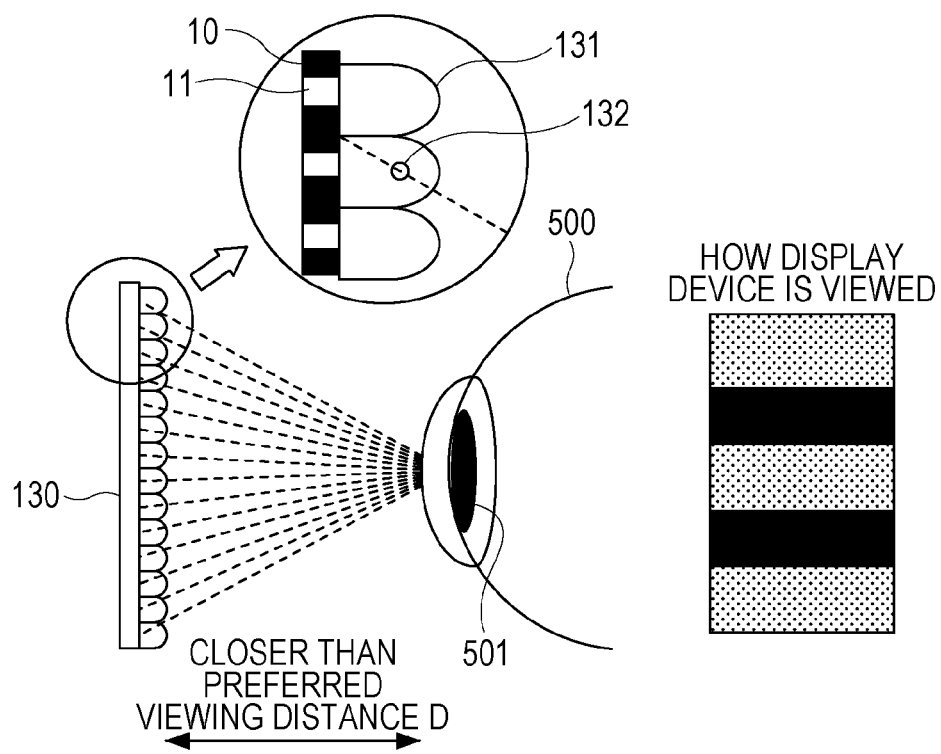

On the other hand, as illustrated in FIG. 9B, when the size of the dark region 303 is less than the diameter of the pupil 501, the light in the light region 302 enters the pupil 501 regardless of relative positions of the pupil 501 and dark region 303. Thus, the person can see the display of the display device 200 (see FIG. 1). FIGS. 10A and 10B are diagrams explaining a relationship between a preferred viewing distance and a stripe pattern. FIGS. 10A and 10B illustrate an optical system with a combination of the light blocking barrier 10 for comparison (see FIG. 4) and the lenticular lens 130 according to the embodiment. The following description is given assuming that the light blocking barrier 10 and the lenticular lens 130 are disposed in this order on the display surface 200A of the display device 200 (see FIG. 1).

FIG. 10A illustrates the case where the pupil 501 of the eyeball 500 is located at the preferred viewing distance D. FIG. 10B illustrates the case where the pupil 501 of the eyeball 500 is located at a position closer than the preferred viewing distance D.

The light entering the pupil 501 through the lenticular lens 130 is light emitted from the display surface 200A positioned on a line connecting the pupil 501 with the curvature center 132.

Therefore, as illustrated in FIG. 9A, when the pupil 501 is located at the preferred viewing distance D, accurate projection may be obtained, and thus the entire display surface 200A may be viewed.

On the other hand, as illustrated in FIG. 9B, when the eyeball 500 approaches the lenticular lens 130 and is located at a point closer than the preferred viewing distance D, a region where the light is blocked by the light blocking barrier 10 enters the pupil 501, causing a stripe pattern (moire) to emerge.

Therefore, it is preferable to inhibit the stripe pattern from emerging even when the eyeball 500 approaches the display device 200. One of the solutions to this is to increase the pinhole effect by using the light blocking barrier 110 (see FIG. 6) according to the embodiment, in which the apertures 111 are formed at the pitch half that of the light blocking barrier 10 for comparison.

Figure 11:
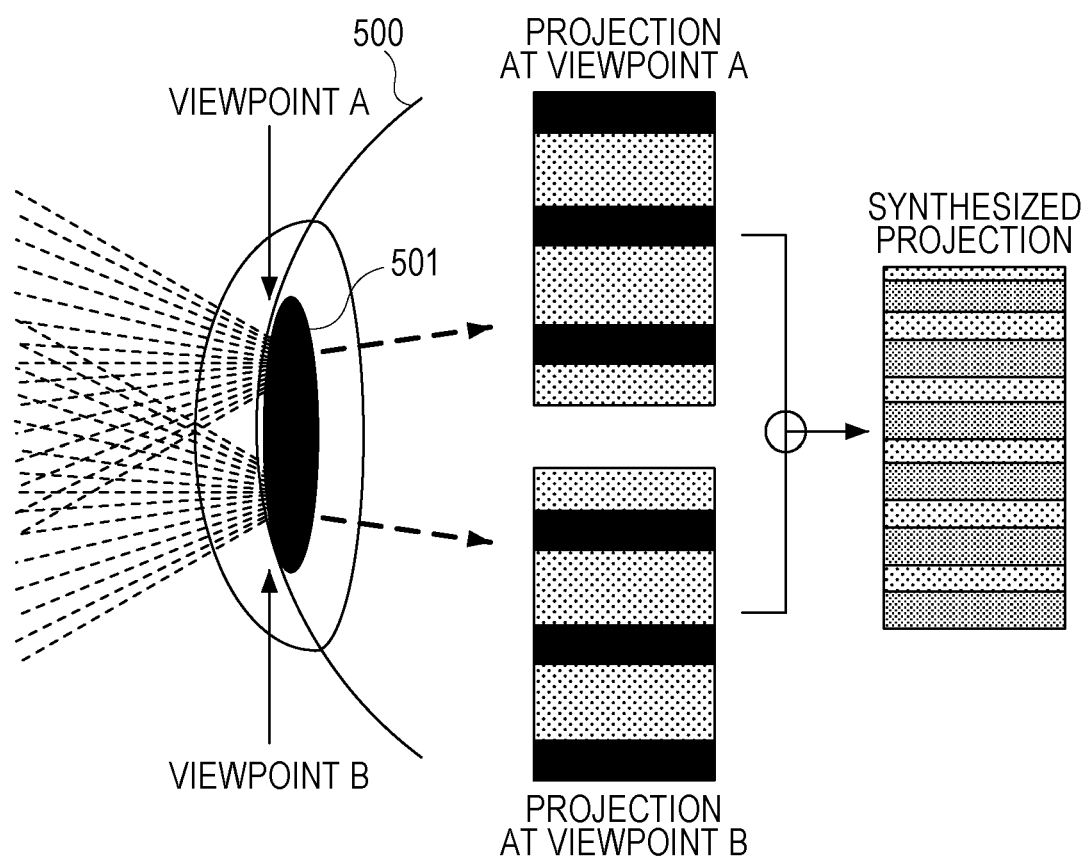
FIG. 11 is a diagram illustrating projections at viewpoints A and B and a synthesized projection when the light blocking barrier 110 according to the embodiment is used.

FIG. 11 is a diagram illustrating projections at viewpoints A and B, and a synthesized projection when the light blocking barrier 110 (see FIG. 6) according to the embodiment is used.

Even if a stripe pattern (moire) is included in the projections obtained at the two viewpoints A and B, the moires having different phases are synthesized and cancelled out each other in the projection obtained by synthesizing the both projections. Thus, the luminance is increased as a whole, resulting in a projection without moire.

Figure 12A:
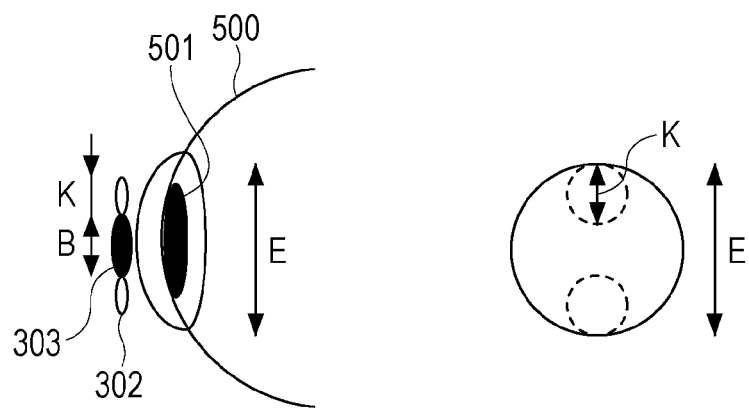
FIG. 12A, FIG. 12B, and FIG. 12C are diagrams illustrating a relationship among a pupil diameter, a light region, and a dark region.
Figure 12B:
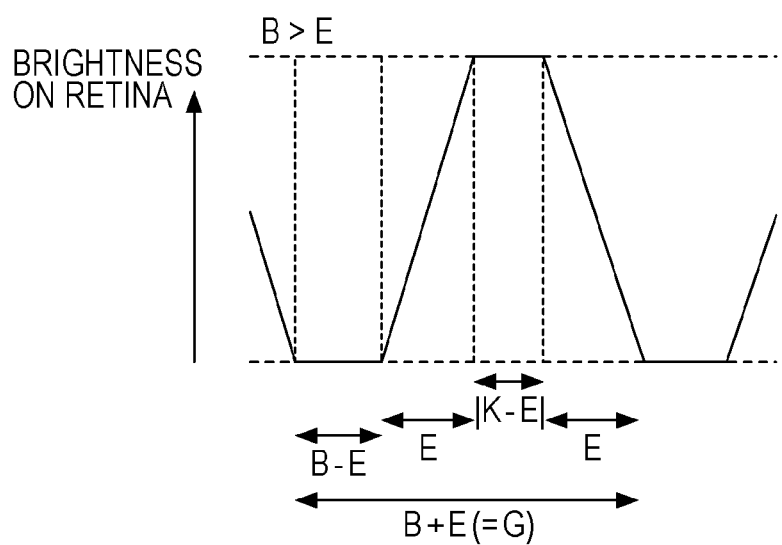
Figure 12C:
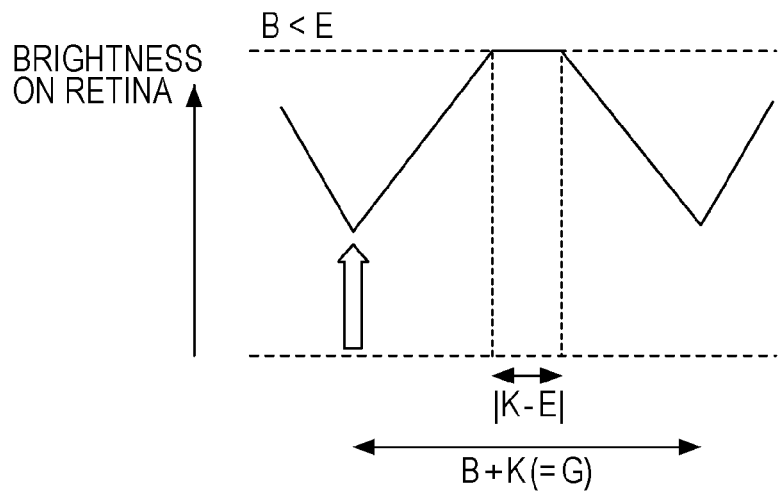

FIGS. 12A to 12C are diagrams illustrating a relationship among a pupil diameter, a light region, and a dark region. The pupil diameter, light region, and dark region are the same as the diameter of the pupil 501, the light region 302, and the dark region 303 illustrated in FIG. 9.

Assuming that a diameter of the light region 302 is K and the pupil diameter is E, with reference to FIG. 12A, since a case is considered, here, where the diameter the diameter K of the light region 302 is smaller than the pupil diameter E (K<E), a range of a bright point with the maximum luminance y=|K−E| and a partial incidence range y'=K+E are established.

Assuming that the size of the dark region 303 in the X-axis or Y-axis direction is B, a range that a completely dark point in the dark region 303 is perceived by the retina is represented as follows.

$y = B - E$ (when $B > E$) (there is no value of $y$ when $E > B$)

In FIGS. 12B and 12C, the vertical axis represents the luminance on the retina and the horizontal axis represents the position in the radial direction on the retina.

As illustrated in FIG. 12B, the presence of the region B-E means that there is a region where nothing is visible.

Therefore, as illustrated in FIG. 12C, it is preferable to obtain the luminance at any position on the retina. A condition for that is B<E, in other words, the size B of the dark region 303 in the X-axis or Y-axis direction is smaller than the pupil diameter E.

The dark region 303 is formed by the mesh-shaped light blocking barrier 110. The light blocking barrier 110 includes apertures 111 formed in a matrix. The pitches in the X-axis and Y-axis directions between the apertures 111 are set so that the size B based on the interval between the apertures 111 adjacent to each other in the X-axis direction or the size B based on the interval between the apertures 111 adjacent to each other in the Y-axis direction is smaller than the pupil diameter E. Thus, a case where the light region 302 does not enter the pupil 501 may be excluded.

Thus, in designing the aperture size and pitch of the apertures 111, the following two conditions are preferably met.

(1) The size B of the dark region 303 in the X-axis or Y-axis direction is smaller than the pupil diameter E, in other words, B<E.

(2) The diameter K of the light region 302 is smaller than the pupil diameter E, in other words, K<E.

Here, a relational expression is derived using a ratio obtained by normalizing B and K with E.

Derivation of relational expression to meet the conditions

The size B of the dark region 303 in the X-axis or Y-axis direction is represented as in the following equation (B1) using a ratio β thereof to E.

$$B = \beta E (\beta > 0) \tag{B1}$$

In order to reduce the dark region 303, β<1 is preferably established from B=βE<E.

Therefore, a condition for $\beta$ is $0<\beta<1$.

Likewise, the luminance E−K on the retina is represented as in the following equation (B2) using a ratio $\alpha$ thereof to E.

$$E-K=\alpha E \tag{B2}$$

Here, E>K, and thus $\alpha$>0.

Here, when solving for K, $K=E(1-\alpha)>0$, and thus $\alpha<1$.

Therefore, a condition for a is $0<\alpha<1$.

The viewpoint interval G may be represented by G=B+K.

By substituting B and K into the above equation, $\beta E+(1-\alpha)E=G$ is established.

Here, using $\gamma$ as a ratio between G and E, $(G=\gamma E)\beta+(1-\alpha)=\gamma$ is established.

Thus, $\beta=\alpha+\gamma-1$ is established.

Figure 13:
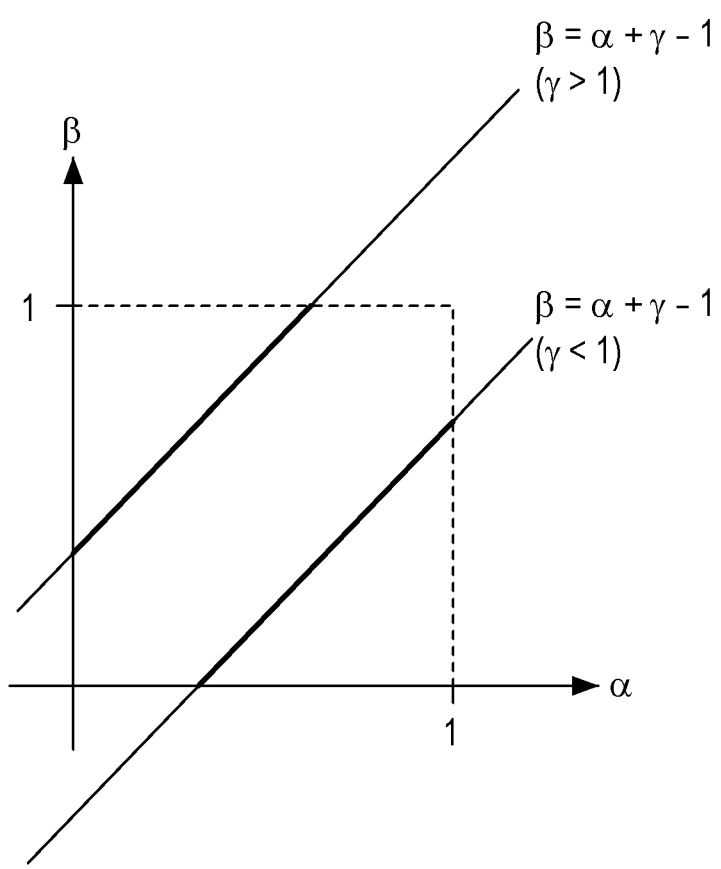
FIG. 13 is a diagram illustrating a relational expression $\beta=\alpha+\gamma-1$ on two-dimensional coordinates.

FIG. 13 is a diagram illustrating the relational expression $\beta=\alpha+\gamma-1$ on two-dimensional coordinates.

A design condition for the light blocking barrier 110 is to set K so as to satisfy $0<\alpha<1$ and $0<\beta<1$.

Here, $\alpha$, $\beta$, and $\gamma$ are parameters that vary between individuals according to the pupil diameter E of each individual. Thus, the viewpoint interval G is determined so that there are $\alpha$ and $\beta$ in the range of the assumed value of the pupil diameter E.

For example, when the viewpoint interval G is appropriately set with the pupil diameter E=4.0 mm, 3.5 mm, and 3.0 mm to obtain conditions for providing a and 13 that satisfy $0<\alpha<1$ and $0<\beta<1$, three combinations of G and K, (G, K)=(4.5, 1.5), (4.0, 1.0), and (3.5, 0.875), may be selected within the range where the viewpoint interval G is 5 mm or less, for example.

As described above, in the optical device 100 according to the embodiment, the following conditions are preferably met to provide a user with clear images without moire in a state where the optical device is attached on the display device 200.

First, since the two lenticular lenses 120 and 130 are disposed overlapping each other, the aperture size of the apertures 111 in the light blocking barrier 110 and the pitches thereof in the X-axis and Y-axis directions are preferably set so as not to cause moire within a range of the preferred viewing distance by the lenticular lens 130 farther away from the display device 200.

Moreover, based on the above condition (1), the aperture size of the apertures 111 in the light blocking barrier 110 and the pitches thereof in the X-axis and Y-axis directions are preferably set so that the size B of the dark region 303 in the X-axis or Y-axis direction is smaller than the pupil diameter E.

In other words, the aperture size of the apertures 111 in the light blocking barrier 110 and the pitches thereof in the X-axis and Y-axis directions are set so that the size B based on the interval between the apertures 111 adjacent to each other in the X-axis direction or the size B based on the interval between the apertures 111 adjacent to each other in the Y-axis direction is smaller than the pupil diameter E.

Furthermore, based on the above condition (2), the aperture size of the apertures 111 in the light blocking barrier 110 and the pitches thereof in the X-axis and Y-axis directions are preferably set so that the diameter K of the light region 302 is smaller than the pupil diameter E.

According to the embodiment, clear images without moire may be provided to the user by setting the aperture size of the apertures 111 in the light blocking barrier 110 and the pitches thereof in the X-axis and Y-axis directions so as to satisfy the above three conditions.

As described above, according to the embodiment, the optical device 100 capable of obtaining clear images without moire may be provided.

Note that the above description is given of the embodiment where the lenticular lenses 120 and 130 are disposed in this order on the display device 200 with the light blocking barrier 110 interposed therebetween. However, the positions of the lenticular lenses 120 and 130 may be switched. In this case, the size and pitch of the apertures 111 in the light blocking barrier 110 may be set so as not to cause moire within the preferred viewing distance of the lenticular lens 120.

Moreover, the above description is given of the embodiment where the apertures in the light blocking barrier 110 are formed in the rectangular shape having a pair of sides parallel to the X-axis and a pair of sides parallel to the Y-axis within the X-Y plane. However, the shape of the apertures 111 is not limited to such a rectangular shape. For example, the apertures may have a shape with four corners trimmed off, a circular shape, or the like.

Furthermore, the above description is given of the embodiment where the width (pitch) of the lens part 121 in the Y-axis direction corresponds to the width (pitch) of one pixel 201 in the Y-axis direction. However, a number of the lens parts 121 may be arranged within one pixel 201 in the Y-axis direction.

In this case, in each pixel 201, the apertures 111 in the light blocking barrier 110 may be disposed so as to fit into the width of the lens part 121 in the Y-axis direction.

Moreover, the above description is given of the embodiment where the width (pitch) of the lens part 131 in the X-axis direction corresponds to the width (pitch) of one sub-pixel (any one of 201R, 201G, and 201B) in the X-axis direction. However, a number of the lens parts 131 may be arranged within one sub-pixel in the X-axis direction. More specifically, a number of the lens parts 131 corresponding to the integral multiple of the number of the sub-pixels may be arranged within one pixel 201 in the X-axis direction.

In this case, in each pixel 201, the apertures 111 in the light blocking barrier 110 may be disposed so as to fit into the width of the lens part 131 in the X-axis direction.

Furthermore, the above description is given of the embodiment using the light blocking barrier 110 formed by burning chromium oxide or the light blocking barrier 110A formed of a thin plate-shaped member made of resin. However, the light blocking barrier may be configured using liquid crystal, instead of the light blocking barriers 110 and 110A.

Furthermore, the above description is given of the embodiment where the viewpoint intervals G are different between the X-axis and Y-axis directions, since the apertures 111 have the rectangular shape having the longitudinal direction in the X-axis direction. However, even when such apertures 111 are used, the viewpoint intervals G may be set the same in the X-axis and Y-axis directions by adjusting the curvatures of the lenticular lenses 120 and 130.

Although the optical device according to the exemplary embodiment of the present disclosure has been described above, the present disclosure is not limited to the embodiment specifically disclosed above, but various modifications and changes may be made without departing from the scope of claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical device disposed on a display surface side of a display device having pixels arranged in a matrix, each pixel having sub-pixels arranged in a first axis direction, the optical device comprising:
   a light blocking barrier disposed on the display surface, the light blocking barrier including M×N apertures for each of the pixels (M is a multiple of the number of the sub-pixels in one pixel and N is an integer), where the M apertures are formed in the first axis direction and the N apertures are formed in a second axis direction perpendicular to the first axis direction;
   a first lens disposed on the side, of the light blocking barrier, opposite to the display surface, the first lens including one or more first lens parts arranged in a stripe pattern within a width of each pixel in the second axis direction, the first lens parts each extending across a region of two or more of the pixels in the first axis direction and having refractive power in the second axis direction; and
   a second lens disposed on the side, of the first lens, opposite to the light blocking barrier or between the light blocking barrier and the first lens, the second lens including second lens parts arranged in a stripe pattern within the width of each pixel in the first axis direction at a pitch obtained by dividing a pitch of the first lens part in the second axis direction by the number of the sub-pixels, the second lens parts each extending across a region of two or more of the pixels in the second axis direction and having refractive power in the first axis direction,
   wherein, in a region within a shorter one of first and second preferred viewing distances where the first preferred viewing distance denotes a preferred viewing distance of the first lens and the second preferred viewing distance denotes a preferred viewing distance of the second lens, an aperture size of the apertures is set so that each of projection regions projected into a space through the apertures, the first lens and the second lens is smaller than a region determined by the size of a pupil, and a first interval between the projection regions adjacent to each other in the first axis direction and a second interval between the projection regions adjacent to each other in the second axis direction are smaller than a diameter of the pupil.

2. The optical device according to claim 1, wherein the light blocking barrier includes:
   a first light blocking part disposed on the display surface, the first light blocking part including M first slits formed within the width of each pixel in the first axis direction, and
   a second light blocking part disposed on a side, of the first light blocking part, opposite to the display surface or between the first light blocking part and the display surface, the second light blocking part including N second slits formed within the width of each pixel in the second axis direction,
   wherein the M first slits and the N second slits form the M×N apertures for each of the pixels in planar view.

3. The optical device according to claim 1, wherein each of the apertures is disposed within the width, in the second axis direction, of the first lens part in the second axis direction, and disposed within the width, in the first axis direction, of the second lens part in the first axis direction.

4. An optical device disposed on a display surface side of a display device having pixels arranged in a matrix, each pixel having sub-pixels arranged in a first axis direction, the optical device comprising:
   a plate disposed on the display surface, the plate including M×N apertures for each of the pixels (M is a multiple of the number of the sub-pixels in one pixel and N is an integer), where the M apertures are formed in the first axis direction and the N apertures are formed in a second axis direction perpendicular to the first axis direction;
   a first lens disposed on the side, of the plate, opposite to the display surface, the first lens including one or more first lens parts arranged in a stripe pattern within a width of each pixel in the second axis direction, the first lens parts each extending across a region of two or more of the pixels in the first axis direction and having refractive power in the second axis direction; and
   a second lens disposed on the side, of the first lens, opposite to the plate or between the plate and the first lens, the second lens including second lens parts arranged in a stripe pattern within the width of each pixel in the first axis direction at a pitch obtained by dividing a pitch of the first lens part in the second axis direction by the number of the sub-pixels, the second lens parts each extending across a region of two or more of the pixels in the second axis direction and having refractive power in the first axis direction,
   wherein, in a region within a shorter one of first and second preferred viewing distances where the first preferred viewing distance denotes a preferred viewing distance of the first lens and the second preferred viewing distance denotes a preferred viewing distance of the second lens, an aperture size of the apertures is set so that each of projection regions projected into a space through the apertures, the first lens and the second lens is smaller than a region determined by the size of a pupil, and a first interval between the projection regions adjacent to each other in the first axis direction and a second interval between the projection regions adjacent to each other in the second axis direction are smaller than a diameter of the pupil.

* * * * *